United States Patent [19]

Williams

[11] 4,195,717
[45] Apr. 1, 1980

[54] CLUTCH AND BRAKE MECHANISM

[75] Inventor: James R. Williams, Martinsville, Ind.

[73] Assignee: General Motors Corporation, Detroit, Mich.

[21] Appl. No.: 864,856

[22] Filed: Dec. 27, 1977

[51] Int. Cl.² .................... F16D 67/04; F16D 25/08
[52] U.S. Cl. .......................... 192/18 A; 192/85 CA; 188/170
[58] Field of Search .............. 192/18 A, 85 CA; 416/169; 192/12 C, 15, 16; 188/170

[56] References Cited

U.S. PATENT DOCUMENTS

| | | | |
|---|---|---|---|
| 3,182,528 | 5/1965 | Lamburn | 192/18 A |
| 3,305,054 | 2/1967 | Liszewski et al. | 192/18 A |
| 3,638,773 | 2/1972 | Lewis et al. | 192/18 A |
| 3,679,033 | 7/1972 | Wagner | 416/169 |
| 3,696,898 | 10/1972 | Sommer | 192/18 A |
| 3,971,461 | 7/1976 | Conroy et al. | 192/18 A |

FOREIGN PATENT DOCUMENTS

| | | | |
|---|---|---|---|
| 329495 | 4/1958 | Fed. Rep. of Germany | 192/18 A |
| 852648 | 10/1960 | United Kingdom | 192/18 A |

Primary Examiner—Leslie Braun
Assistant Examiner—David C. Reichard
Attorney, Agent, or Firm—John C. Evans

[57] ABSTRACT

A combination clutch and brake unit for an engine driven lift fan propeller system controls power transfer from an engine to a propeller assembly and includes a clutch selectively operated by a hydraulic piston between engaged and disengaged positions to couple a drive input to a drive output and wherein a carriage for a hydraulic piston in a clutch supports a movable brake component and shifts it with respect to a fixed reaction brake member to brake the output shaft of the device to prevent free wheeling of the lift fan propeller when it is decoupled from the engine and wherein the clutch piston is biased into its decoupled position by return springs that also maintain the brake components in an engaged positon when the clutch is decoupled.

2 Claims, 3 Drawing Figures

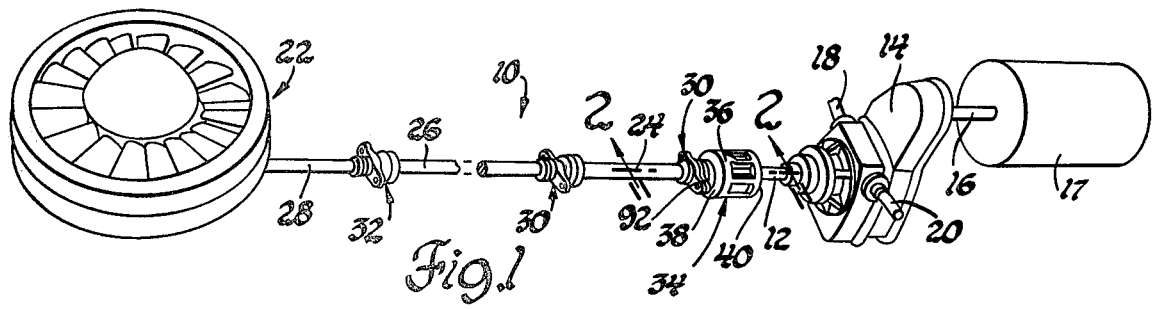
Fig.1
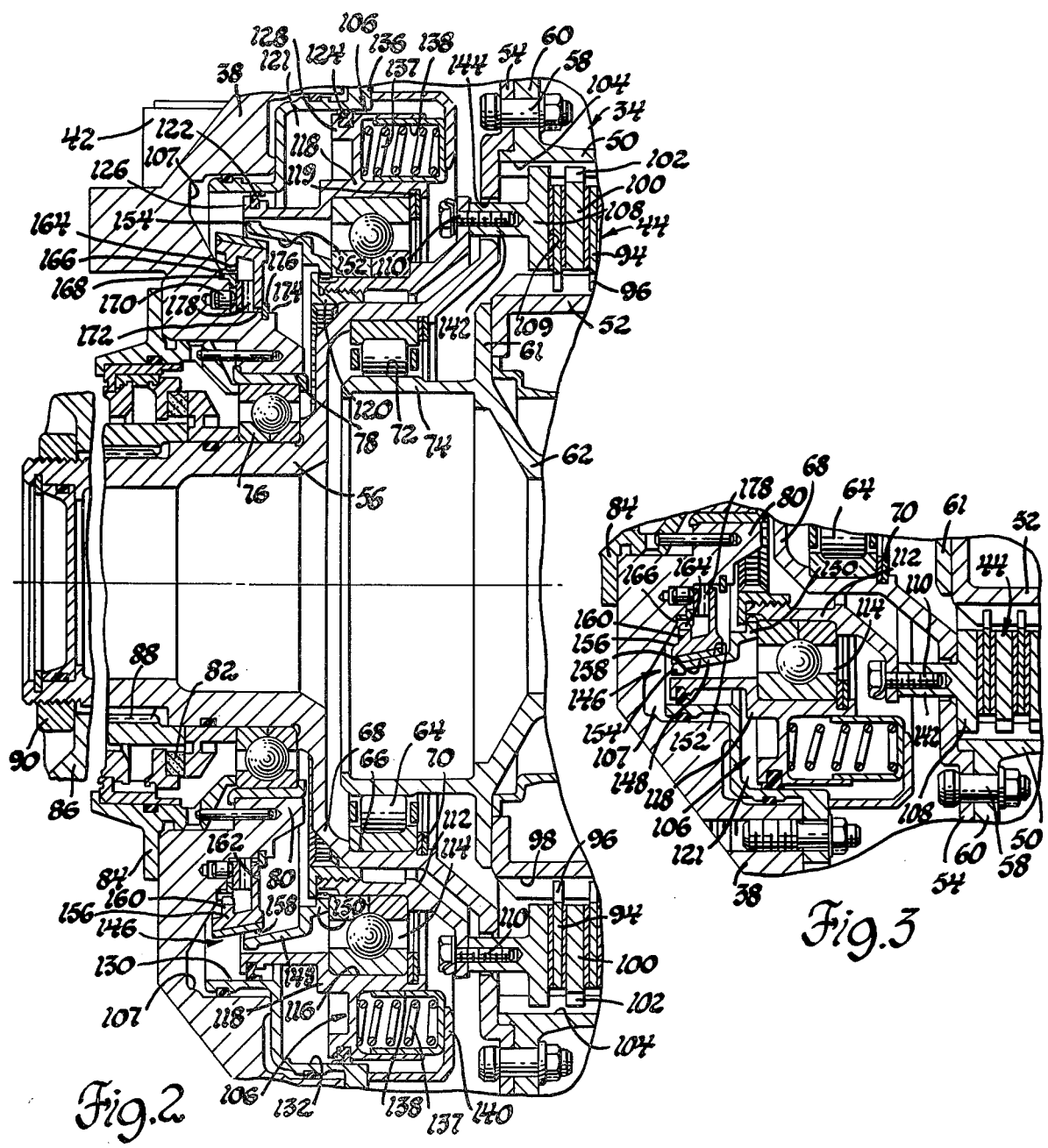
Fig.2
Fig.3

CLUTCH AND BRAKE MECHANISM

This invention relates to propeller drive systems and more particularly to fan lift and propeller drive systems including a hydraulically operated clutch operating piston and including a brake for preventing fan free wheel and resultant rotation of a decoupled clutch output shaft.

In vertical takeoff and landing aircraft, clutch devices of unitary configuration are utilized to selectively connect a gas turbine engine to a fan or propeller unit during a lift mode of operation. Such clutch devices are characterized by having a hydraulically operated piston therein which exerts a clamp-up pressure on friction plates within the unitary clutch assembly to affect rotation of the output shaft in response to input shaft operation on operator demand. In such arrangements, the hydraulically operated piston is maintained energized until input and output clutch members are mechanically interconnected during the drive mode of operation.

A specific example of such a drive and lift system is set forth in copending U.S. application, Ser. No. 853,178, now U.S. Pat. No. 4,157,135, filed Nov. 21, 1977. In this arrangement, an engine drive shaft is coupled to the input of a clutch assembly between a combiner box of the drive system and a forward or nose fan unit that is used during a vertical take-off mode of aircraft operation. The clutch is a self-contained unit operable to transmit in excess of 11,000 hp at full fan drive speed and includes friction drive discs therein operated by a hydraulic piston control into an engaged phase of operation until a lock mechanism is operated upon synchronous speed of operation between the input and the output of the clutch.

In such arrangements it is desirable to prevent free wheeling of the fan propeller assembly and clutch output drive when the clutch is decoupled.

Accordingly, an object of the present invention is to provide an improved combination brake and clutch assembly including means compactly arranged within a clutch housing to brake the output shaft of the clutch to prevent its drive by a free wheeling propeller of a fan lift assembly when there is no power transfer thereto from an associated drive engine for the fan lift unit.

Another object of the present invention is to provide an improved clutch and brake unit having self-contained components within a single housing located directly within a drive line between a power source and a variable pitch, lift fan unit and including an outer clutch member and an inner clutch member connected respectively to an output shaft and an input shaft; each having clutch friction plate secured thereto; and further including a hydraulically operated piston at one end of the housing operable to pressure the clutch plates together in response to operator demand and wherein the hydraulically operated piston includes return springs for locating the piston in a deenergized position when the clutch is disengaged; the piston for energizing the clutch having a movable brake component secured thereto for axial movement with respect to a reaction brake component secured to the housing at one end thereof outboard of the hydraulic piston; the piston positioning the movable brake component in a disengage position when the clutch is engaged and the return springs biasing the movable brake component into braking relationship with the reaction brake component when the clutch is disengaged to produce a brake action on the clutch output shaft so as to prevent its drive by free wheeling of a fan or propeller component of the variable pitch lift fan unit.

Further objects and advantages of the present invention will be apparent from the following description, reference being had to the accompanying drawings wherein a preferred embodiment of the present invention is clearly shown.

FIG. 1 is a view in perspective of a mechanical drive for a lift fan including the clutch and brake assembly of the present invention;

FIG. 2 is a fragmentary, enlarged, longitudinal section view taken along the line 2—2 of FIG. 1 looking in the direction of the arrows with brake and clutch components of the present invention in a first operative position wherein power is transferred from a source to a fan lift unit; and FIG. 3 is a fragmentary, enlarged sectional view of the clutch and brake components of FIG. 2 in a second operative position wherein the fan lift unit is decoupled from the power source and a fan component is braked to prevent free wheeling.

Referring now to the drawings in FIG. 1, a drive system 10 is illustrated including an input shaft 12 adapted to be connected to the output from a combiner gear box 14 having an input shaft 16 thereto connected to a gas turbine engine 17. The combiner gear box 14 includes side output shafts 18, 20 that are directed laterally therefrom to interconnect main power propulsion units for power transfer thereto from the gear box.

Such a mechanical drive system is suitable for use in lift cruise type propulsion systems wherein the main propulsion engines are operated during a forward thrust phase of operation and power transfer can be directed therefrom to an auxiliary variable pitch propeller type lift fan unit 22. More particularly, in the illustrated arrangement the lift fan unit 22 is connected by a plurality of shaft segments 24, 26 and 28 and interconnected couplings 30, 32 to transfer power from the gear box under control of a self-contained, light weight combined brake and clutch unit 34.

The lift fan unit 22 may, for example, be a front located fan unit operable during vertical take-off and landing modes of an aircraft. In such arrangements, power is supplied from the combiner gear box and directed through the brake and clutch unit 34 to operate the fan during such modes at pilot demand. The brake and clutch unit 34 is operable to disconnect the fan unit 22 from the combiner gear box 14 during conventional flight modes of operation where the main propulsion engines are used to drive the aircraft and to concurrently brake the fan unit.

In accordance with certain principles, the brake and clutch unit 34 includes an outer case 36 having end plates 38, 40 to define a modular assembly that has unusual compactness and is adapted for an in-line drive train configuration of the type set forth in FIG. 1. The brake and clutch unit 34 is operable to transmit up to 11,000 HP at fan drive speeds of between 8,000 and 10,000 RPM.

The brake and clutch unit 34 is under the control of a clutch pressure valve 42 mounted on the end plate 38. It is also under the control of a lock system more specifically set forth in copending U.S. patent application Ser. No. 853,178, now U.S. Pat. No. 4,157,135, filed Nov. 21, 1977.

More particularly, the brake and clutch unit 34 includes an internal oil cooled disc type clutch 44 having an outer clutch member 50 and an inner clutch member 52 in the form of telescoped tubular members. The other clutch member 50 is connected to a radially outwardly directed large diameter open end 54 of an output shaft 56 by a plurality of circumferentially located nut and bolt elements 58 each of which are secured to a radially outwardly directed flange 60 of the outer clutch member 50. The inner clutch member 52 is fixedly secured to an intermediate flange segment 61 formed on the inboard end of a tubular, open ended input shaft 62.

The input shaft 62 is rotatably supported by a roller bearing assembly 64 that is supportingly received within an internally located circumferentially grooved surface 66 on the radial flange 68 of the output shaft 56. The bearing assembly 64 is held in place by a snap ring 70 seated in a locking groove on the flange 68 and assembly 64 supportingly receives the outer surface 72 of an inboard stub 74 of the shaft 62. The output shaft 56 is supportingly received by a bearing assembly 76 located in a bearing support bore 78 formed in an inboard flared nose 80 of the end plate 38. The bearing assembly 76 is associated with a face type carbon seal assembly 82 supported on the front end of the end plate 38 by means of an annular seal assembly support plate 84. The output flange 86 is connected by means of a splined couple 88 to the outer surface of the shaft 56 and is held in place thereon by means of a shaft ring nut 90.

In the illustrated arrangement, the output flange 86 has a radially outwardly directed segment 92 thereon that is adapted to be connected to ears of one of the couplings 30 as shown in FIG. 1 whereby the output of the brake and clutch unit 34 will be directed to the lift fan unit 22. In the aforesaid arrangement, the inner clutch member 52 is connected to flange 61 and thereby is rotated relative to the outer clutch member 50 and the relative speed therebetween is dependent upon the amount of engagement between a first plurality of axially spaced friction clutch plates 94 that have a plurality of radially inwardly located fastener tabs 96 fixedly secured to the inner clutch member 52 at axial grooves 98 therein. Interleaved between each of the clutch plates 94 are a second plurality of axially spaced clutch discs 100 having tab ends 102 thereon fixedly secured to the outer clutch member 50 at axial grooves 104 therein.

A clutch piston operator mechanism 106 in cavity 107 of end plate 38 includes an annular piston pressure applicator 108 with an annular flat face 109 thereon in engagement with the leftmost one of the plurality of spaced clutch plates 94 as shown in FIG. 2. The piston pressure applicator 108 is connected by means of screws 110 to a carriage 112 that is rotatably mounted by means of a bearing assembly 114 in a bearing bore 116 of a hydraulic piston 118. A split retainer ring 119 holds bearing assembly in place at its outer race. Inner race of bearing assembly 114 is retained by a threaded ring 120 on carriage 112. A pressurizable chamber 121 in communication with the outlet of valve 42 is sealed at opposite ends thereof by means of annular seals 122, 124 supportingly received within an outboard grooved end 126 and intermediate grooved wall 128 of the piston 118. The seals 122, 124 are slidably sealingly located for reciprocation with respect to step bores 130, 132 formed on a stepped cylinder 134 that is press fit within the cavity 107 and and is secured therein by means of a bracket 136. The piston 118 is biased to the left as shown in FIG. 1 by a plurality of return springs 137 that are located in inboard recesses 138 of the piston 118 so that each of the springs 137 is biased between it and a radially inwardly dependent flange 140 of bracket 136 for the cylinder 134.

Each applicator 108 has a stem 142 directed through an opening 144 in a radially outwardly inboard end of carriage 112 so that operation of mechanism 106 will shift bearing assembly 114 axially of plate 38 and carriage 112 axially of the clutch 44.

The brake and clutch unit 34 includes a brake assembly including a movable brake member 148 having an annular radial flange 150 thereon fixedly secured to the carriage 112 in juxtaposed relationship with the inner race of the bearing assembly 114. The brake member 148 includes a radially outwardly divergent wear surface 152 with a peripheral tip 154 thereon. The brake assembly 146 further includes a rotatably fixed reaction brake member 156 having a generally conically configured outer peripheral wear surface 158 thereon that is located within the cavity 107 by a pair of dependent flanges 160, 162, both of annular form. The outboard flange 160 includes a plurality of axial splines 164 on its distal end that mate with axial splines 166 of an L-shaped ring member 168 that is held in place by means of dowel pins 170 located at spaced circumferential points along one leg of the L-shaped ring and threadably secured to the end plate 38 to fix the L-shaped ring 168 in place with respect thereto. The inboard one of the flanges 162 has its distal end 172 supportingly guided by an annular guide surface 174 on the nose 80 of the outer end plate 38. A split ring retainer 176 is connected to the guide surface 174 inboard of the distal end 172 to serve as an inboard stop for the reaction brake member 156. The inboard flange 162 is biased against the ring retainer 176 by a wave spring 178 that is supported circumferentially of the guide surface 174. The wave spring 178 will yieldingly control outboard axial movement of the reaction brake member 156 to smoothly mate the conically configured wear surface 158 to the wear surface 152 on the movable brake member 148 during the brake phase of operation.

In accordance with certain principles of the present invention, the brake assembly 146 is located in a compact relationship with respect to the clutch piston mechanism 106 to produce a combined clutch and brake operation within the confines of a readily accessible outboard location of the unitary brake and clutch unit 34. Moreover, the movable brake member 148 is associated with the movable carriage 112 of the clutch piston mechanism 106 so as to be responsive to the spring action of the return springs 137 so that the spring force of the return springs 137 will maintain the movable brake member 148 in a biased braking relationship to the reaction brake member 156 during the braking mode of operation while serving the concurrent function of moving the hydraulic piston 118 into a release position when hydraulic pressure is removed from the chamber 121 during a clutch disengage phase of operation.

More particularly, operation of the improved combined brake and clutch unit 34 includes an initial energization step wherein hydraulic fluid is directed into the chamber 121 in accordance with operator demand at which point the piston 118 will move to the right as shown in FIG. 2 against the force of the return springs 137 to carry the carriage 112 and bearing assembly 114 thereon to the right so that the flat face 109 will cause the friction clutch plates 94 and clutch discs 100 to be pressured together to couple the input shaft 62 to the output shaft 56. During this phase of operation, the movable brake member 148 is maintained out of contact with the reaction member 156 of the brake assembly 146.

The engaged location of the component parts of the combined brake and clutch unit 34 are set forth in FIG. 2. In this mode of operation, the reaction member 156 is maintained by the wave spring 178 to locate the inboard flange 162 against the reference surface defined by the spline ring retainer 176. The conically configured wear surface 158 is thereby conditioned for a subsequent braking operation and moreover is located in spaced relationship to the wear surface 152 on the movable brake member 148 which is shifted into an axially spaced relationship with respect to the reaction member 156. Power is transferred from the gear box 14 to the fan unit 22 to produce a lift effect therefrom during a vertical take-off phase of operation.

It is recognized that during other modes of aircraft operation it is desirable to brake the output shaft 56 so that there will be no rotation thereof when the fan unit 22 is decoupled from the power source.

More particularly, this is attained in the present invention by operation of the piston clutch mechanism 106 into a disengage position, again at pilot demand. Under this circumstance, hydraulic pressure is removed from the chamber 121 and the return springs 137 will accordingly force the piston 118, bearing assembly 114 and carriage 112 to the left as shown in FIG. 3. Concurrently, the movable brake member 148 has its wear surface 152 moved axially against the wear surface 158 on the reaction brake member 156. The wave spring 178 will compress to accommodate axial adjustment of the taper defined by wear surface 152 and wear surface 158 to assure positive full surface contact braking therebetween. The return springs 137 have a preselected rate that is sufficient to maintain an axial bias between the braking components to assure a resultant braking force sufficient to maintain the output shaft 56 locked against any tendency for free wheeling of the fan unit 22 to produce a reverse drive throughout from the output shaft 56 into the operative components of the disc type clutch 44.

By virtue of the aforesaid arrangement a positive clutch action and brake control are provided by use of a common clutch piston carriage and return spring assembly which will produce clutch component disengagement while simultaneously producing brake engagement and wherein the movable brake component can be connected to existing clutch components without modification thereof and the reaction brake component can be connected axially of existing clutch components by a simple modification of an end case component of the clutch assembly.

While the embodiments of the present invention, as herein enclosed, constitute a preferred form, it is to be understood that other forms might be adopted.

The embodiments of the invention in which an exclusive property or privilege is claimed are defined as follows:

1. A clutch and brake unit for association with an engine driven lift fan assembly to control power transfer from the engine to the lift fan assembly comprising: an outer housing with an output end case, a drive input from the engine, a drive output to the lift fan assembly, clutch means coupled to said drive input and said drive output having a clutch applicator with a disengaged position and an engaged position to produce clutch slip upon initial power transfer from said drive input to said drive output to accelerate the drive output to a speed synchronized with that of said drive input, an inboard cavity within said output end case, means including a hydraulic operator within said inboard cavity and including a reciprocating piston selectively pressurized and connected by an axially movable thrust bearing and bearing carriage to the clutch applicator to position said clutch means in its engaged position, means including return springs outboard of said clutch applicator and in engagement with said piston for returning said piston when said operator is depressurized thereby to position said clutch means in its disengaged position, and a drive output brake located within said inboard cavity including a rotatable brake member secured to said drive output by said bearing carriage for rotation therewith, a nonrotatable reaction brake member secured to said end case radially inwardly of and axially positioned with respect to said rotatable brake member, said rotatable brake member being located radially inwardly of said piston and being axially movable by said piston out of engagement with said reaction brake member when said clutch means is engaged, means including said piston return spring for biasing said rotatable brake member into engagement with said reaction brake member when said operator is depressurized to brake said drive output when the clutch is disengaged thereby to prevent free wheeling of the fan lift assembly.

2. A clutch and brake unit for association with an engine driven lift fan assembly to control power transfer from the engine to the lift fan assembly comprising: an outer housing with an output end case, a drive input from the engine, a drive output to the lift fan assembly, clutch means with clutch plates coupled to said drive input and said drive output having a clutch applicator with a disengaged position and an engaged position to produce clutch slip upon initial power transfer from said drive input to said drive output to accelerate the drive output to a speed synchronized with that of said drive input, an inboard cavity with said output end case, means including a hydraulic operator within said inboard cavity and including a reciprocating piston selectively pressurized and connected by an axially movable thrust bearing and bearing carriage to the clutch applicator to position said clutch means in its engaged position, means including return springs outboard of said clutch applicator and in engagement with said piston for moving said piston axially away from said clutch plates when said operator is depressurized thereby to position said clutch means in its disengaged position, a bearing assembly having an inner and an outer race, said outer race axially connected to said piston for rotatably supporting said bearing within said piston, said carriage member for said bearing assembly axially fixed to the inner race of said bearing assembly to be carried therewith axially in response to positioning of said piston and rotatably by said drive output, a drive output brake located within said inboard cavity including a rotatable brake member secured to said carriage for rotation therewith, a nonrotatable reaction brake member secured to said output end case radially inwardly of and axially positioned with respect to said rotatable brake member, said rotatable brake member being located radially inwardly of said piston and axially movable by said carriage out of engagement with said reaction brake member when said clutch means is engaged, means including said piston return springs for biasing said rotatable brake member into engagement with said reaction brake member when said operator is depressurized to brake said drive output when the clutch is disengaged thereby to prevent free wheeling of the fan lift assembly.

* * * * *